(12) United States Patent
Zeng et al.

(10) Patent No.: US 7,606,187 B2
(45) Date of Patent: Oct. 20, 2009

(54) SYSTEM AND METHOD TO SUPPORT MULTICAST ROUTING IN LARGE SCALE WIRELESS MESH NETWORKS

(75) Inventors: Surong Zeng, Altamonte Springs, FL (US); Avinash Joshi, Orlando, FL (US)

(73) Assignee: MeshNetworks, Inc., Maitland, FL (US)

( * ) Notice: Subject to any disclaimer, the term of this patent is extended or adjusted under 35 U.S.C. 154(b) by 634 days.

(21) Appl. No.: 10/975,587

(22) Filed: Oct. 28, 2004

(65) Prior Publication Data

US 2006/0098607 A1 May 11, 2006

(51) Int. Cl.
*H04H 20/71* (2008.01)
(52) U.S. Cl. .............. 370/312; 370/370; 370/338; 370/351; 370/432; 455/503
(58) Field of Classification Search ......... 455/437; 370/338, 392, 256, 370, 351, 432, 312
See application file for complete search history.

(56) References Cited

U.S. PATENT DOCUMENTS

| | | | |
|---|---|---|---|
| 6,353,596 B1 * | 3/2002 | Grossglauser et al. | 370/256 |
| 6,807,165 B2 | 10/2004 | Belcea | |
| 6,873,839 B2 | 3/2005 | Stanforth | |
| 2001/0034793 A1 * | 10/2001 | Madruga et al. | 709/238 |
| 2002/0058502 A1 | 5/2002 | Stanforth | |
| 2003/0067892 A1 | 4/2003 | Beyer et al. | |
| 2003/0079040 A1 | 4/2003 | Jain et al. | |
| 2003/0095504 A1 | 5/2003 | Ogier | |
| 2004/0125776 A1 * | 7/2004 | Haugli et al. | 370/338 |
| 2004/0143842 A1 | 7/2004 | Joshi | |
| 2005/0153725 A1 * | 7/2005 | Naghian et al. | 455/520 |
| 2005/0265283 A1 * | 12/2005 | Qi et al. | 370/331 |

FOREIGN PATENT DOCUMENTS

| | | | |
|---|---|---|---|
| JP | 2008519489 A | | 6/2008 |
| WO | 2006050085 A2 | | 5/2006 |
| WO | 2006050085 A3 | | 5/2006 |

OTHER PUBLICATIONS

P. Gupta and P.R. Kumar, "The Capacity of Wireless Networks," IEEE Transactions on Information Theory, Issue 2, Mar. 2000.

(Continued)

*Primary Examiner*—Charles N Appiah
*Assistant Examiner*—Kwasi Karikari
(74) *Attorney, Agent, or Firm*—Randi L. Karpinia; Joseph J. Buczynski (57) ABSTRACT

Provided is a system and method for a multicast routing algorithm to work in infrastructure based mesh networks. It chooses access points, fixed infrastructure gateway nodes connected to each other and/or the global internet via a wired/wireless backbone, as a group of local multicast group leaders to form a multicast group leader cloud. Each local multicast group leader is elected on-demand according to the local multicast group member's request. Each local multicast group leader forms a local multicast tree rooted at this leader connecting all multicast group members associated with the AP. The processes of electing and maintaining local multicast trees rooted at APs enable efficient coordination with underlying unicast routing to exploit the advantages of fixed infrastructure nodes. Therefore, routing overhead and multicast tree convergence time are reduced. The method can support large networks with fast topology change due to fast convergence and reduced routing overhead.

41 Claims, 3 Drawing Sheets

OTHER PUBLICATIONS

M.J. Miller, W.D. List and N.H. Vaidya, "A Hybrid Network Implementation to Extend Infrastructure Reach," Technical Report, Jan. 2003.

E.M. Royer and C.E. Perkins, "Multicast Operation of the Ad-Hoc On-Demand Distance Vector Routing Protocol," MobiCom '99, Seattle, WA, Aug. 1999.

S. Lee, W. Su and M. Gerla, "On-Demand Multicast Routing Protocol in Multihop Wireless Mobile Networks," vol. 7, Issue 6, Dec. 2002.

PCT International Preliminary Examination Report Application No. PCT/US2005/038915—Dated Mar. 5, 2009—10 Pages.

PCT International Search Reportand Written Opinion Application No. PCT/US2005/038915—Dated Feb. 12, 2008—11 Pages.

Korean Application No. 10-2007-7011827 Preliminary Rejection Dated Jan. 13, 2009—3 Pages.

* cited by examiner

SYSTEM AND METHOD TO SUPPORT MULTICAST ROUTING IN LARGE SCALE WIRELESS MESH NETWORKS

BACKGROUND OF THE INVENTION

1. Field of the Invention

The present invention relates to large scale multi-hop wireless ad-hoc networks. It proposes a multicast routing algorithm for large scale wireless mesh networks.

2. Description of the Related Art

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at a first node to communicate simultaneously with several other nodes in its coverage area.

In recent years, a type of mobile communications network known as an "ad-hoc" network has been developed. In this type of network, each mobile node is capable of operating as a base station or router for the other mobile nodes, thus eliminating the need for a fixed infrastructure of base stations.

More sophisticated ad-hoc networks are also being developed which, in addition to enabling mobile nodes to communicate with each other as in a conventional ad-hoc network, further enable the mobile nodes to access a fixed network and thus communicate with nodes of other networks, such as those on the public switched telephone network (PSTN) and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", issued on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", and in U.S. Pat. No. 6,873,839 entitled "Prioritized-Routing for an Ad-Hoc, Peer-to-Peer, Mobile Radio Access System", issued on Mar. 29, 2005, the entire content of each being incorporated herein by reference.

The capacity of pure multi-hop wireless Ad Hoc networks diminishes as the number of nodes increases in the network as explained by P. Gupta and P. R. Kumar, in "The Capacity of Wireless Networks", *IEEE Transactions on Information Theory*, Issue 2, March 2000, the entire content being incorporated herein by reference. In order to increase the capacity of multi-hop wireless Ad Hoc networks, fixed infrastructure nodes may be introduced into the network, as described in "The Capacity of Wireless Networks", *IEEE Transactions on Information Theory*, Issue 2, March 2000, by P. Gupta and P. R. Kumar, and in "A Hybrid Network Implementation to Extend Infrastructure Reach," *Technical Report*, January 2003, by M. J. Miller, W. D. List, and N. H. Vaidya, the entire content being incorporated herein by reference. In order to reduce the route discovery latency in this kind of hybrid multi-hop wireless Ad Hoc network, hybrid routing protocol and network management have been proposed in "A Hybrid Network Implementation to Extend Infrastructure Reach," *Technical Report*, January 2003, and in U.S. Patent Application Pub. No. 2004/0143842A1, the entire content being incorporated herein by reference.

The essence of hybrid routing and network management protocols is, for each device in the network, to maintain a route to the access point (AP) proactively and discover other routes reactively. During the network operation, each device periodically refreshes the route and registration to the AP. This process actually maintains a spanning tree rooted at the AP. In order to support multicasting in the hybrid multi-hop wireless Ad Hoc networks, a multicast algorithm is needed. A number of multicast algorithms for wired networks were designed in recent decades. Protocol independent multicast—sparse mode (PIM-SM) as described in "PIM-SM: Protocol Specification", RFC 2362, by D. Estrin et al., and core based tree (CBT) as described in "Core Based Trees (CBT) Multicast Routing Architecture", RFC 2201, by T. Ballardie, both build shared trees among the group members to support multicast in large scale static networks. Protocol independent multicast—dense mode (PIM-DM) as described in "PIM v2 DM Specification", Internet Draft, by S. Deering, distance vector multicast routing protocol (DVMRP) as described in "Distance Vector Multicast Routing Protocol", RFC 1075, by D. Waitzman et al, and multicast open shortest path first (MOSPF) as described in "Multicast Extensions to OSPF", RFC 1584, by J. Moy, all build source specific trees between sources and group members to support multicast in small scale static networks. None of these methods takes the high dynamics into consideration for the mobile networks. They are not suitable for infrastructure based large scale wireless mesh networks.

Multiple multicast algorithms for pure wireless ad hoc networks were proposed in the last few years. The tree-based multicast algorithms for wireless Ad Hoc networks include Multicast Ad-hoc On-demand Distance Vector (MAODV) protocol which is described in "Multicast Operation of the Ad-Hoc On-Demand Distance Vector Routing Protocol", MobiCom'99, August 1999, by E. M. Royer and C. E. Perkins. MAODV dynamically builds a tree rooted at the multicast group leader. The mesh-based multicast algorithms include On-Demand Multicast Routing Protocol (ODMRP) which is described in "On-Demand Multicast Routing Protocol in Multihop Wireless Mobile Networks", Mobile Networks and Applications, Volume 7, Issue 6, December 2002, by S. Lee, W. Su and M. Gerla. ODMRP dynamically establishes and maintains a mesh by the source on demand. Both algorithms can not support large dense wireless ad hoc networks with high dynamics due to the high latency of building the multicast routes and high routing overhead for large scale wireless networks. The meshed tree-based multicast algorithm Core Assisted Mesh Protocol (CAMP), which is described in US patent application US2001/0034793A1, Oct. 25, 2001, uses multiple cores to mesh the shared tree to connect all the group members. However, its cores are dynamically elected, hence it cannot build the meshed tree in a very short time to support the fast topology change. Additionally, the cores are meshed to each other through the mobile nodes in the network, hence the meshing among cores are vulnerable to the mobility. Thus, none of the existing ad hoc multicast routings are suitable for the large scale mesh networks with high dynamics.

The proposed Multicast Mesh Scalable Routing (MMSR) deals with multicast support in the large scale wireless mesh networks with high dynamics.

Multicasting is a more efficient method of supporting group communication than unicasting or broadcasting, as it allows transmission and routing of packets to multiple destinations using fewer network resources. Along with widespread deployment of wireless networks, the fast-improving capabilities of mobile devices, and an increasingly sophisticated mobile work force worldwide, content and service providers are increasingly interested in supporting multicast communications over wireless networks. As more and more applications and network control protocols requiring the multicast support, multicast routing algorithms are necessary in wireless multi-hop ad-hoc networks to support high efficiency of the traffic distribution in multiple users in the network. Compared to other existing multicast routing algorithms for wireless networks, the proposed algorithm has better scalability for large scale, highly dynamic wireless ad-hoc networks with relatively low network overhead.

SUMMARY OF THE INVENTION

The present invention provides a system and method for a multicast routing algorithm MMSR to work in large scale mesh networks with infrastructure nodes deployed. It chooses access points (APs), i.e. fixed infrastructure gateway nodes connected to each other and/or the global internet via a wired/wireless backbone, as a group of local multicast group leaders to form a multicast group leader cloud. Each local multicast group leader is elected on-demand according to the local multicast group member's request. Each local multicast group leader forms a local multicast tree rooted at this leader to connect all multicast group members that are associated with the AP. The processes of electing and maintaining local multicast trees rooted at APs make MMSR able to coordinate with underlying unicast routing efficiently to exploit the advantages of fixed infrastructure nodes. Therefore, the routing overhead and multicast tree convergence time are reduced. MMSR can support large networks with fast topology change due to its fast convergence and the reduced routing overhead.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
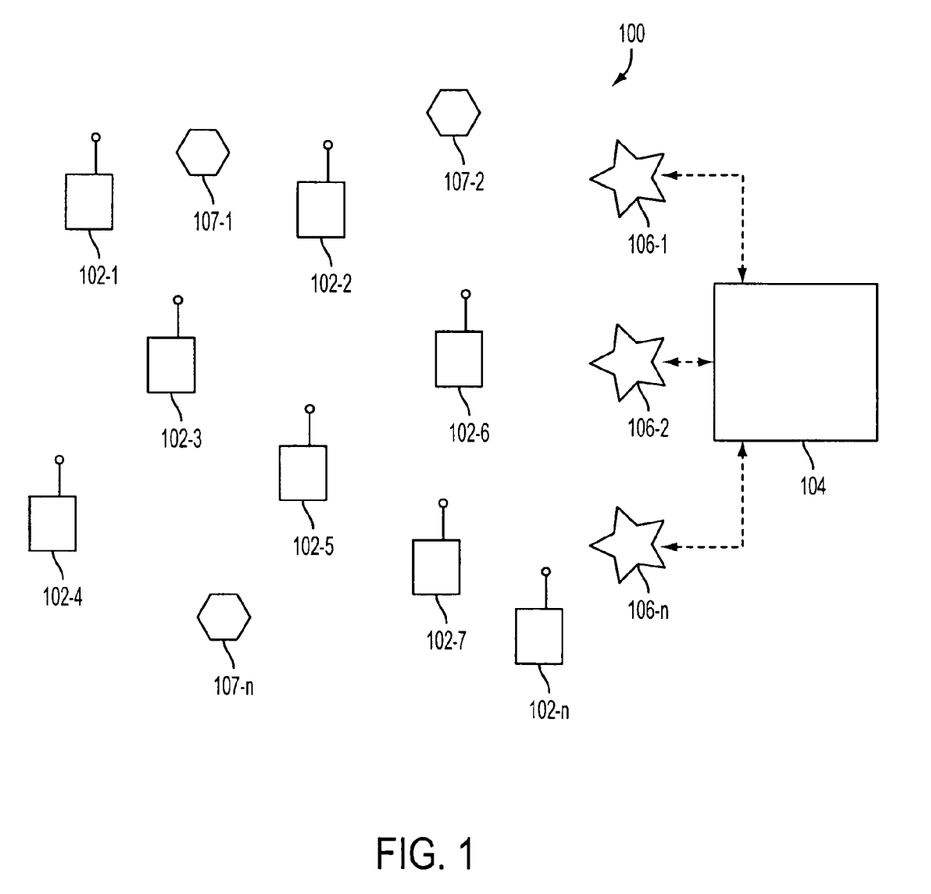
FIG. 1 is a block diagram of an example ad-hoc wireless communications network including a plurality of nodes.

FIG. 1 is a block diagram illustrating an example of an ad-hoc packet-switched wireless communications network 100. Specifically, the network 100 includes a plurality of mobile wireless user terminals 102-1 through 102-n (referred to generally as nodes 102 or mobile nodes 102), and includes a fixed network 104 having a plurality of access points 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. Nos. 7,072,650, 6,807,165, and 6,873,839, referenced above.

Figure 2:
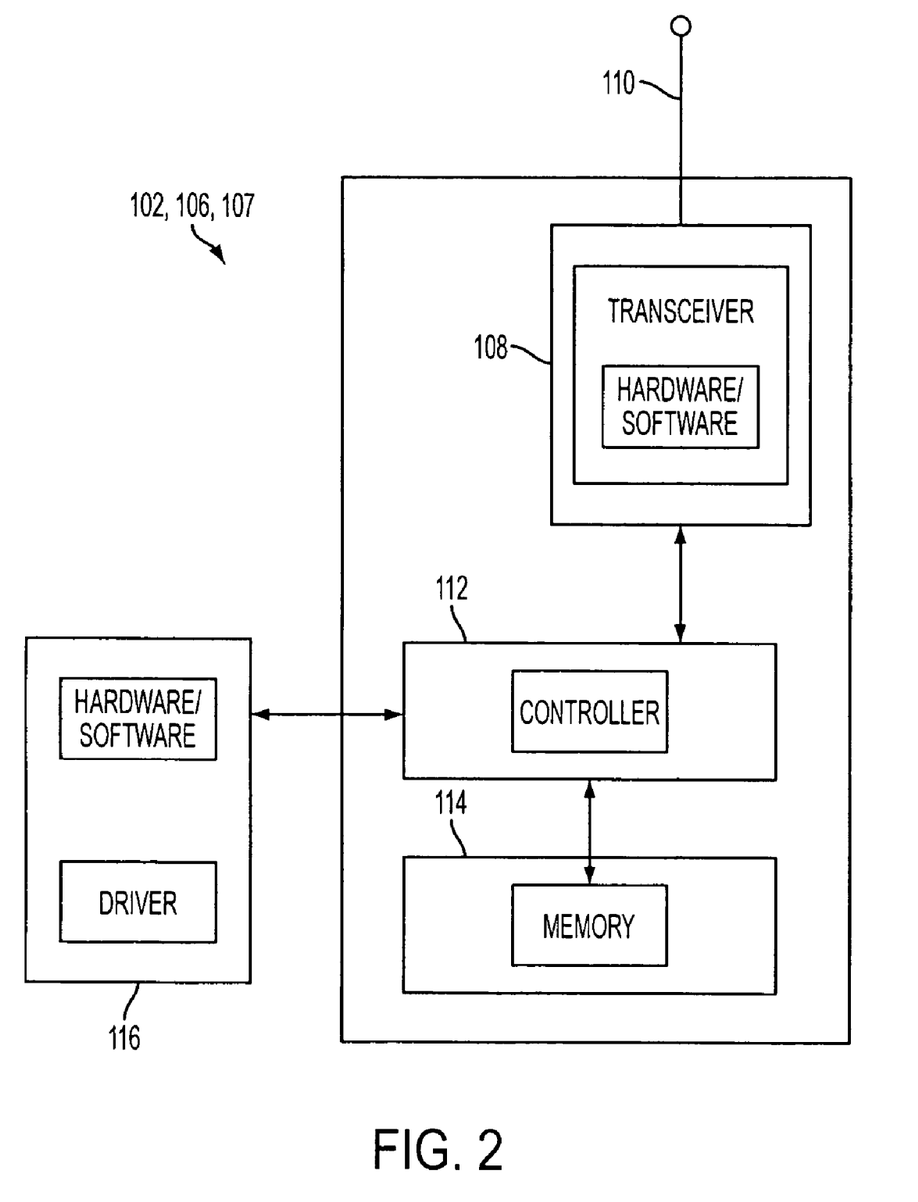
FIG. 2 is a block diagram illustrating an example of a mobile node employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

The present invention supports multicast in large, highly dynamic infrastructure based wireless mesh networks by exploring the advantage of the infrastructure nodes.

Multicast Group Leader Cloud

The present invention defines a new concept, the multicast group leader cloud. The multicast group leader cloud consists of mulitple local multicast group leaders. These local multicast group leaders can be viewed as forming the distributed multicast group leader across the backbone to connect the large multicast group spread in a wide area.

The AP is on-demand chosen as the local multicast group leader for multicast group members that are associated with the AP. As explained in the background section, the hybrid routing in the infrastructure based meshnetworks sets up and maintains a spanning tree rooted in the AP. Forming a similar multicast tree rooted in AP can make it easy for the proposed multicast routing protocol to unify with the hybrid unicast routing such as the one proposed in U.S. Patent Application Pub. No. 2004/0143842A1. There are numerous advantages to combining unicast and multicast routing in the same network. The route information obtained when searching for a multicast route can also increase unicast routing knowledge, and vice versa. Consequently, the route setup and maintenance overhead will be reduced, and the routing operation will be simplified. For instance, if a node returns a route for a multicast group to some source node, that source node, in addition to learning how to reach the multicast group, will also have learned of a route to the node returning that information. In a mobile environment, any reduction in control overhead is a significant advantage for a routing protocol. In the following description, the explanation of the algorithm is in the context of the hybrid routing protocol proposed in U.S. Patent Application Pub. No. 2004/0143842A1 for convenience. However, this proposed protocol can be used together with any other proactive routings and reactive routings which dynamically search for and maintain routes to the APs.

Figure 3:
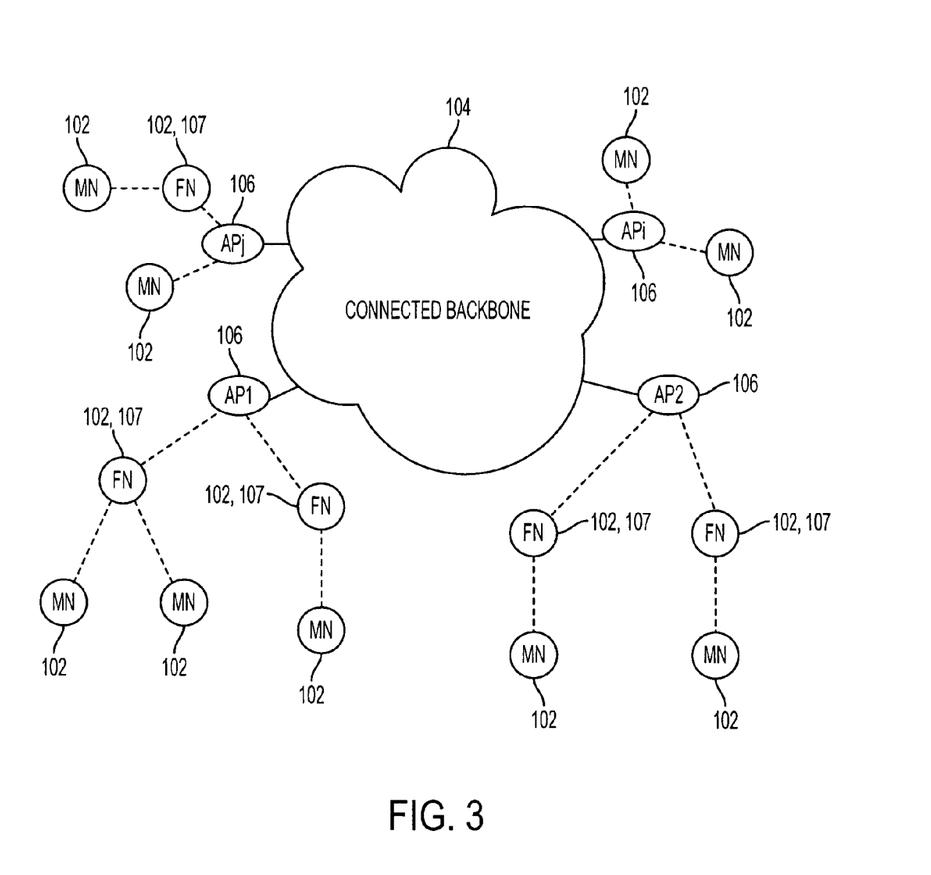
FIG. 3 is a block diagram of an example of a hybrid communications network employing a system and method in accordance with an embodiment of the present invention.

The invention proposes to choose the AP as the local multicast leader for all members who are associated with this AP. Therefore, the leader election is highly simplified by default designating members' associated AP as the local leader. For large scale wireless mesh networks, multiple APs are deployed to increase the network capacity. Multicast group members can be distributed across the large area and associated with different APs. All these APs are designated as the local multicast leaders to form a multicast group leader cloud. Those local leaders are connected via the wired/wireless backbone, and provide the gateway functionality to the global internet. Therefore, the wireless multicast group is automatically merged with the wired multicast group via the group leader cloud to send/receive to/from the global internet. One example is shown in FIG. 3. Due to the proactively maintaining the route to the associated AP and handing-off to the new AP according to the route quality, the MMSR takes the advantage from the underlying unicast protocols such as the one proposed in U.S. Patent Application Pub. No. 2004/0143842A1 to realize the smooth multicast route handoff promptly between local multicast group leaders in a large mesh network with highly dynamic topology change.

Routing Tables

Each node in the network maintains a unicast routing table. Each entry in the unicast routing table records information including, for example:
  Destination Address
  Destination Sequence Number
  Routing Metrics to Destination
  Next Hop
  Lifetime In a network supporting multicast, a node is a multicast router if it is a member of the multicast tree. In the multicast router, besides the unicast routing table, it also maintains a multicast routing table. Each entry in the multicast routing table records information including, for example:
  Multicast Group Address
  Multicast Group Leader Address
  Routing Metrics to Multicast Group Leader
  Next Hops (to different branches on the multicast tree)

The Next Hops field is a linked list of structures, each of which may include the following fields:
  Next Hop Address
  Activated Flag
  Lifetime for this Next Hop
  Node type The node type indicates whether this is the upstream node to the local multicast group leader, i.e. this is the node used to unicast the traffic to the local multicast group leader which is the root of the local multicast tree. The Next Hop can not be used to forward multicast messages until it is activated by specific control packet. The lifetime is extended by periodic refreshing action from the group member to the group leader.

Multicast Tree Forming

The multicast tree is formed on-demand to connect multicast group members. Any node can send multicast traffic to the group, but only the group members can receive multicast traffic. When a node wishes to join a multicast group, and it does not have a multicast route to the multicast group, it initiates a multicast route setup process to the multicast group. It unicasts a join route request (RREQ) packet to its associated AP. The route to the AP is proactively maintained once each node is associated with an AP. The packet carries information including, for example:
  Source Address (Originating node address)
  Destination Address (Originating node's associated AP address)
  Desired Multicast Group Address On the way to the AP, RREQ enables the multicast entry for this branch, but marks the next hop associated with the requested multicast group entry as inactviated.

When the AP gets the join RREQ, it checks its multicast routing table as to whether it is a local multicast group leader. If it is a local multicast group leader, the AP responds with a join route reply (RREP) back to the requesting node. On the way back to the requesting member node, RREP activates all the entries for this requested multicast group along the route. After exchanging the RREQ and RREP, the multicast branch is graft to the local multicast tree rooted at the AP.

If the AP is not a local multicast group leader, it should first enable its capability to accept the multicast traffic from the backbone, and create a multicast entry for the requested multicast group. Upon enabling itself as the local multicast group leader to send/receive to/from the backbone, the AP responds with the RREP back to the requesting member and starts the first branch for the local multicast tree.

In the descriptions above, the joining process is described. In this method, the local multicast tree rooted at the AP can be formed. Any member node can distribute the traffic to the local multicast tree. When the packet reaches the local multicast group leader, the leader will forward one copy of the packet to the backbone side. The multicast traffic can reach other local multicast leaders via the backbone network cloud. Those local leaders can further distribute the traffic down to their own local tree. In this way, the multicast traffic can be distributed in the whole mesh network.

A node which is not a group member also can send the traffic to the multicast group. It does not need to set up the multicast route to the multicast group. The node only needs to tunnel the multicast traffic to the local multicast group leader which is its associated AP. The local multicast group leader is responsible for disseminating the traffic down to the local multicast group tree and the backbone.

Multicast Tree Maintenance

Pruning

A node may terminate its membership in the multicast group during the normal network operation. However, if the node is not a leaf node of the tree, meaning that it has more than one next hop in its next hop list for this multicast group, it must continue to serve as a router for the tree. If the node is a leaf node, it may prune itself from the tree by using a route pruning request (RPRUNE) message. An RPRUNE, carrying one or more multicast group addresses, is forwarded to the only next hop of this multicast group. Upon receiving the RPRUNE, the next hop deletes the previous hop from its next hop list for this multicast group. After pruning the previous hop, if this node becomes a leaf node, it also can prune itself using the same way if it is not a multicast group member.

When a link breakage is detected, the upstream node prunes the branch connected by this branch. The downstream node may discover and set up new multicast route to the same AP or handoff to the new AP.

Refreshing

A node may unicast RREQ to its associated AP to refresh its group membership. Along the route to its associated AP, the intermediate nodes may extend the lifetime for two next hops to the multicast group. These two next hops specifically are the previous hop and the next hop of the RREQ. At the same time, the intermediate nodes may also extend their timer to issue next refreshing unicast RREQ. In this way, for each branch, each time only one unicast RREQ will be issued to the AP for extending the lifetime for all nodes' membership on this branch. When a next hop is timed out, the node can purify this next hop from the multicast routing table after a grace period. Similar to the pruning operation, if this node becomes a leaf node, it can prune itself if it is not a multicast group member but just a forwarding node.

Fast Handoff

The proposed multicast routing algorithm takes advantage of the underlying hybrid unicast routing protocol to speedily and smoothly handoff the multicast branch. As soon as the underlying unicast routing discovers a better unicast route to the AP, or discovers a better AP with which to be associated, the member node will unicast a join RREQ to enable a new branch between it and its AP, and automatically choose the new AP as its local multicast group leader. Before the handoff succeeds, the node still uses the old multicast branch to send and receive multicast traffic. In this way, the multicast routing algorithm can support high mobility and follow the fast topology change.

Multicast Traffic Forwarding and Duplicates Detection

All the nodes on the multicast tree accept non-duplicate packets, and forward them to all the next hops for this multicast group other than the one from which the packets came.

Besides forwarding the traffic on the wireless multicast tree, the local multicast group leader, i.e. the AP node, also forwards the traffic to the backbone side. When other APs receives the multicast traffic via the backbone, they MAY accept the traffic if they are the local multicast group leaders for the same multicast group, and they are responsible for distributing the traffic down to their local shared trees rooted at them for this multicast group.

Each packet will carry a sequence number in its packet header for multicast/broadcast traffic duplicates detection. Each multicast tree member maintains a list to record the sequence numbers of packets it received for each source. Every sequence number will be recorded in the list for a period equal to NET_TRAVERSAL_TIME. If this node receives a packet with a sequence number which is not seen within the NET_TRAVERSAL_TIME, it accepts this packet as a new packet, otherwise, it deletes the packet as a duplicate.

The present invention discloses a multicast routing algorithm MMSR to work in large scale infrastructure based wireless mesh networks. It chooses APs, i.e. the fixed infrastructure gateway nodes connected to each other and/or the global internet via the wired/wireless backbone, as a group of local multicast group leaders to form a multicast group leader cloud. Each local multicast group leader is elected on-demand according to the local multicast group member's request. Each local multicast group forms the local multicast tree rooted at this leader to connect all multicast group members which are associated with the AP. The processes of electing and maintaining local multicast trees rooted at APs make MMSR able to coordinate with underlying unicast routing efficiently to exploit the advantages of fixed infrastructure nodes. Therefore, the routing overhead and multicast tree convergence time are reduced. MMSR can support large network with fast topology change due to its fast convergence and the reduced routing overhead.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for supporting multicast routing in a multi-hop wireless ad hoc network that includes a plurality of fixed infrastructure nodes communicatively coupled to a backbone, the method comprising:

selecting certain infrastructure nodes as local multicast group leaders;

forming a plurality of local multicast trees each rooted at a local multicast group leader, and each comprising a plurality of members;

transmitting a message packet destined for a plurality of destination nodes, wherein each of the plurality of destination nodes is a member of at least one local multicast tree, and further wherein each of the plurality of destination nodes is a member of at least one multicast group identified by a multicast group address associated with the multicast group, from a node to a first local multicast group leader, wherein the message packet includes the multicast group address;

forwarding the message packet to the backbone by the first local multicast group leader;

receiving the message packet by at least one other local multicast group leader via the backbone; and distributing the message packet to the plurality of destination nodes by each of the at least one other local multicast group leaders distributing the message packet to each member having the multicast group address of its associated local multicast tree, wherein each packet transmitted in multicast or broadcast traffic carries a sequence number in the packet's packet header, the method further comprising:

deleting a packet newly received by a node when the packet carries a sequence number that has been previously received by the node; and accepting a packet newly received by the node when the packet carries a sequence number that has not been previously received by the node.

2. The method of claim 1, further comprising:

forming a multicast group leader cloud comprising the local multicast group leaders, wherein there are connections between the local multicast group leaders, wherein the connections between the local multicast group leaders in the multicast group leader cloud include wired connections.

3. The method of claim 1, further comprising:

forming a multicast group leader cloud comprising the local multicast group leaders, wherein there are connections between the local multicast group leaders, wherein the connections between the local multicast group leaders in the multicast group leader cloud include wireless connections.

4. The method of claim 1, wherein at least one local multicast group leader operates to access the internet.

5. The method of claim 1, further comprising:
searching for and maintaining routes to the local multicast group leaders.

6. The method of claim 5, wherein the step of searching for and maintaining routes comprises:
employing proactive and reactive routing that dynamically searches for and maintains routes to the local multicast group leaders.

7. The method of claim 1, wherein each node in the network maintains a unicast routing table.

8. The method of claim 1, wherein each local multicast tree comprises at least one forwarding member, and wherein each forwarding member maintains a multicast routing table.

9. The method of claim 1, wherein the local multicast trees are formed on-demand.

10. The method of claim 1, further comprising:
when a node wishes to join a multicast group, unicasting a join route request packet from the node to an access point with which the node is associated.

11. The method of claim 10, further comprising:
when the access point is a local multicast group leader, sending a join route reply from the access point to the requesting node, wherein the join route reply activates one or more entries within one or more forwarding members of the requested multicast group along a route between the access point and the requesting node.

12. The method of claim 10, wherein when the access point is not a local multicast group leader, the method further comprises:
enabling the access point's ability to accept multicast traffic from the multicast group leader cloud;
creating a multicast entry for the requested multicast group in a multicast routing table; and
sending a join route reply from the access point to the requesting node, wherein the join route reply activates one or more entries within one or more forwarding members of the requested multicast group along a route between the access point and the requesting node.

13. The method of claim 1, further comprising:
sending a route pruning request from a leaf node to a next hop node in the multicast group to which the leaf node belongs; and
deleting the requesting leaf node from a next hop list of the next hop node that received the route pruning request.

14. The method of claim 1, further comprising:
unicasting a route request from a requesting node to the requesting node's local multicast group leader in order to refresh the requesting node's group membership.

15. The method of claim 14, wherein unicasting the route request to the local multicast group leader extends life times for memberships of all nodes belonging to a branch to which the requesting node belongs.

16. The method of claim 14, further comprising:
extending life times for a previous hop and a next hop of the route request at an intermediate node along the route from the requesting node to the local multicast group leader.

17. The method of claim 1, further comprising:
using unicast routing to discover a better unicast route from a node to a local multicast group leader than a current route between the node and the local multicast group leader;
unicasting a join route request to enable a new route between the requesting node and the local multicast group leader; and
before the requesting node switches to the new route, continuing to utilize the previous route for the requesting node to send and receive multicast traffic.

18. The method of claim 1, further comprising:
using unicast routing to discover a preferable access point for a node to be associated with compared to an access point that is currently the node's local multicast group leader;
unicasting a join route request to enable a new branch between the requesting node and the discovered access point;
selecting the discovered access point as the requesting node's local multicast group leader; and
before the requesting node switches to the new branch, continuing to utilize the previous branch to the previous multicast group leader for the requesting node to send and receive multicast traffic.

19. The method of claim 1 further comprising:
maintaining a list in each member node of sequence numbers for packets received by each member node; and
maintaining each sequence number on the list for a period of time,
wherein the deleting step comprises deleting a packet newly received by a node when the packet carries a sequence number that is currently being maintained on the receiving node's sequence number list, and
wherein the accepting step comprises accepting a packet newly received by a node when the packet carries a sequence number that is not currently being maintained on the receiving node's sequence number list.

20. A communications network, the network comprising:
a plurality of wireless nodes;
a plurality of fixed infrastructure nodes communicatively coupled to a backbone;
a multicast group including at least some of the wireless nodes and at least some of the fixed infrastructure nodes, the multicast group comprising:
a plurality of local multicast trees each rooted at a local multicast group leader selected from the plurality of the fixed infrastructure nodes, and further each local multicast tree comprising at least one wireless node,
wherein the multicast group operates to distribute a message packet to the plurality of wireless nodes and the plurality of fixed infrastructure nodes by:
transmitting the message packet destined for a plurality of destination nodes, wherein each of the plurality of destination nodes is a member of at least one local multicast tree, and further wherein each of the plurality of destination nodes is a member of at least one multicast group identified by a multicast group address associated with the multicast group, from a node to a first local multicast group leader, wherein the message packet includes the multicast group address;
forwarding the message packet to the backbone by the first local multicast group leader;
receiving the message packet by at least one other local multicast group leader via the backbone; and
distributing the message packet to the plurality of destination nodes by each of the at least one other local multicast group leaders distributing the message packet to each member having the multicast group address of its associated local multicast tree;
packets carrying a sequence number in a packet header;
at least one multicast group member operating to delete a packet newly received when the packet carries a sequence number that has been previously received by the at least one multicast group member; and accept a packet newly received when the packet carries a sequence number that has not been previously received by the at least one multicast group member.

21. The network of claim 20, further comprising wired connections between infrastructure nodes.

22. The network of claim 20, further comprising wireless connections between infrastructure nodes.

23. The network of claim 20, wherein at least one infrastructure node operates to access the internet.

24. The network of claim 20, wherein the plurality of wireless nodes employ unicast routing to search for and maintain routes to the fixed infrastructure nodes.

25. The network of claim 20, wherein each node in the network maintains a unicast routing table.

26. The network of claim 20, wherein each member of a multicast tree maintains a multicast routing table.

27. The network of claim 20, wherein the local multicast trees are formed on-demand.

28. The network of claim 20,
wherein each wireless node operates to join a multicast group when desired by unicasting a join route request packet to an access point with which the requesting wireless node is associated but which is not a local multicast group leader; and
wherein the access point operates to, upon receipt of the join route request, enable its ability to accept multicast traffic from other local multicast group leaders, create a multicast entry for the requested multicast group in a multicast routing table, and send a join route reply to the requesting wireless node,
wherein the join route reply activates one or more entries within one or more forwarding members of the requested multicast group along a route between the access point and the requesting wireless node.

29. The network of claim 20,
wherein each wireless node operates to join a multicast group by unicasting a join route request packet to a local multicast group leader; and
wherein the local multicast group leader operates to send a join route reply to the requesting wireless node,
wherein the route reply activates one or more entries within one or more forwarding members of the requested multicast group along a route between the local multicast group leader and the requesting wireless node.

30. The network of claim 20, further comprising:
a leaf node, wherein the leaf node operates to send a route pruning request to a next hop in a multicast group to which the leaf node belongs; and
wherein the next hop node receiving the route pruning request deletes the requesting leaf node from the receiving next hop node's next hop list.

31. The network of claim 20, further comprising:
at least one multicast group member node operating to unicast a route request to a local multicast group leader in order to refresh the requesting node's group membership.

32. The network of claim 31, further comprising:
one or more intermediate nodes, along the route from the requesting node to the local multicast group leader, wherein the one or more intermediate nodes operate to extend life times for a previous hop and a next hop of the route request.

33. The network of claim 31, wherein the unicasting of the route request extends life times for group memberships of all nodes belonging to a branch to which the requesting node belongs.

34. The network of claim 20, further comprising:
at least one multicast group member operating to discover a better unicast route to a local multicast group leader than a current route between the member and the local multicast group leader, and further operating to unicast a join route request to enable a new route between the requesting member and the local multicast group leader.

35. The network of claim 34, wherein the group member continues to utilize the previous route to send and receive multicast traffic, until the requesting member switches to the new route.

36. The network of claim 20, further comprising:
at least one multicast group member operating to use unicast routing to discover a preferable access point to be associated with compared to an access point that is currently the member's local multicast group leader, and to unicast a join route request to enable a new branch between the requesting member and the discovered access point, and to select the discovered access point as the requesting member's local multicast group leader.

37. The network of claim 36, wherein the group member continues to utilize the previous branch to the previous multicast group leader in order to send and receive multicast traffic until the requesting member switches to the new branch.

38. The network of claim 20,
wherein the at least one multicast group member further operates to maintain a list of sequence numbers for packets received, and to maintain each sequence number on the list for a period of time, and to delete a newly received packet if the received packet carries a sequence number that is currently being maintained on the member's sequence number list, and to accept a newly received packet if the packet carries a sequence number that is not currently being maintained on the member's sequence number list.

39. The network of claim 20, wherein the plurality of wireless nodes comprise mobile ad hoc wireless nodes.

40. The method of claim 1, wherein the node comprises a member node of a first local multicast tree of with the first local multicast group leader.

41. The method of claim 1, wherein the node is not a member node of a first local multicast tree of with the first local multicast group leader, wherein the first local multicast group leader comprises an associated access point of the node, and further wherein the node transmits the message packet to the first local multicast group leader by tunneling the message packet to the first local multicast group leader.

* * * * *